(12) United States Patent
Sargent et al.

(10) Patent No.: US 11,875,592 B2
(45) Date of Patent: *Jan. 16, 2024

(54) ELONGATED FINGERPRINT SENSOR

(71) Applicant: Apple Inc., Cupertino, CA (US)

(72) Inventors: Daniel B. Sargent, San Francisco, CA (US); Dale Setlak, Merritt Island, FL (US); Giovanni Gozzini, Berkeley, CA (US); John Raff, Menlo Park, CA (US); Michael B Wittenberg, Sunnyvale, CA (US); Richard H. Koch, Cupertino, CA (US); Ron A. Hopkinson, Campbell, CA (US)

(73) Assignee: Apple Inc., Cupertino, CA (US)

( * ) Notice: Subject to any disclaimer, the term of this patent is extended or adjusted under 35 U.S.C. 154(b) by 173 days.

This patent is subject to a terminal disclaimer.

(21) Appl. No.: 17/484,165

(22) Filed: Sep. 24, 2021

(65) Prior Publication Data

US 2022/0012451 A1 Jan. 13, 2022

Related U.S. Application Data

(63) Continuation of application No. 16/786,762, filed on Feb. 10, 2020, now Pat. No. 11,275,920, which is a
(Continued)

(51) Int. Cl.
*G06V 40/13* (2022.01)
*G06F 3/044* (2006.01)
(Continued)

(52) U.S. Cl.
CPC .......... *G06V 40/1306* (2022.01); *G06F 3/044* (2013.01); *G06F 21/32* (2013.01);
(Continued)

(58) Field of Classification Search
CPC ............ G06V 40/1306; G06V 40/1365; G06F 3/044; G06F 21/32; G06F 3/04883; G06F 2203/04105
See application file for complete search history.

(56) References Cited

U.S. PATENT DOCUMENTS 6,834,181 B2 12/2004 Kaikuranta et al.
6,853,336 B2 2/2005 Asano et al.
(Continued)

FOREIGN PATENT DOCUMENTS

CN 206977392 U 2/2018
CN 108200238 6/2018
(Continued)

OTHER PUBLICATIONS

Borghi et al., "Driver Face Verification with Depth Maps," *Sensors*, 2019, vol. 19, No. 3361, pp. 1-16.
(Continued)

*Primary Examiner* — Utpal D Shah
(74) *Attorney, Agent, or Firm* — Brownstein Hyatt Farber Schreck, LLP

(57) ABSTRACT

An elongated biometric device provides a slim solution for capturing biometric data, and may be placed on a portion of an electronic device having limited space, such as a side of the electronic device. The elongated biometric device may include a force sensor, which may be positioned within a housing of the electronic device and actuated through posts extending from the elongated biometric device through the housing to transfer an applied force to the force sensor.

19 Claims, 9 Drawing Sheets

Related U.S. Application Data continuation of application No. 15/853,478, filed on Dec. 22, 2017, now abandoned.

(60) Provisional application No. 62/564,046, filed on Sep. 27, 2017.

(51) Int. Cl.
   *G06F 21/32* (2013.01)
   *G06V 40/12* (2022.01)
   *G06F 3/04883* (2022.01)

(52) U.S. Cl.
   CPC ...... *G06V 40/1365* (2022.01); *G06F 3/04883* (2013.01); *G06F 2203/04105* (2013.01)

(56) References Cited

U.S. PATENT DOCUMENTS

| | | | |
|---|---|---|---|
| 7,142,827 B2 | 11/2006 | Dufosse et al. | |
| 7,452,077 B2 | 11/2008 | Meyer et al. | |
| 7,463,756 B2 | 12/2008 | Benkley et al. | |
| 7,474,799 B2 | 1/2009 | Bassi et al. | |
| 7,620,175 B2 | 11/2009 | Black et al. | |
| 8,207,897 B2 | 6/2012 | Alvey et al. | |
| 8,553,874 B2 | 10/2013 | Holmes et al. | |
| 9,030,440 B2 | 5/2015 | Pope et al. | |
| 9,501,685 B2 | 11/2016 | Bernstein et al. | |
| 9,524,413 B2* | 12/2016 | Kim | G06V 40/1306 |
| 9,651,513 B2 | 5/2017 | Dunlap et al. | |
| 9,697,409 B2 | 7/2017 | Myers | |
| 9,767,971 B2 | 9/2017 | Hisano | |
| 9,811,713 B2* | 11/2017 | Pi | H04L 63/0861 |
| 9,876,273 B2 | 1/2018 | Lui et al. | |
| 9,922,229 B2 | 3/2018 | Cao et al. | |
| 9,924,004 B2 | 3/2018 | Park | |
| 9,959,444 B2 | 5/2018 | Young et al. | |
| 10,007,343 B2* | 6/2018 | Kim | G06F 3/041 |
| 10,049,251 B2 | 8/2018 | Cao et al. | |
| 10,054,430 B2 | 8/2018 | Mor et al. | |
| 10,128,907 B2* | 11/2018 | He | G06F 3/04162 |
| 10,146,304 B2 | 12/2018 | Werblin et al. | |
| 10,146,982 B2* | 12/2018 | Hsu | G06V 40/1365 |
| 10,198,131 B2 | 2/2019 | Yang et al. | |
| 10,201,273 B2 | 2/2019 | Choukroun et al. | |
| 10,204,262 B2 | 2/2019 | Price et al. | |
| 10,356,500 B2 | 7/2019 | Kim | |
| 10,361,851 B2 | 7/2019 | Wu | |
| 10,361,861 B2* | 7/2019 | Wu | H04M 1/0283 |
| 10,401,158 B2 | 9/2019 | Gernoth et al. | |
| 10,425,561 B2 | 9/2019 | Jarvis et al. | |
| 10,430,630 B2 | 10/2019 | Zhang | |
| 10,469,722 B2 | 11/2019 | Trail | |
| 10,542,245 B2 | 1/2020 | Cho et al. | |
| 10,564,521 B1 | 2/2020 | Zhu | |
| 10,606,218 B1 | 3/2020 | Ely et al. | |
| 10,656,596 B2 | 5/2020 | Callagy et al. | |
| 10,699,094 B2 | 6/2020 | Shim et al. | |
| 10,721,348 B2 | 7/2020 | Choi et al. | |
| 10,824,203 B2 | 11/2020 | Wong et al. | |
| 10,839,194 B2 | 11/2020 | Jung et al. | |
| 10,901,310 B2 | 1/2021 | Ma et al. | |
| 10,949,637 B2 | 3/2021 | Kang et al. | |
| 10,990,792 B2 | 4/2021 | Park et al. | |
| 11,049,271 B2 | 6/2021 | Xu et al. | |
| 11,189,248 B1 | 11/2021 | Lee et al. | |
| 11,209,146 B2 | 12/2021 | Chang et al. | |
| 11,233,924 B2 | 1/2022 | Noh et al. | |
| 11,258,163 B2 | 2/2022 | Froese et al. | |
| 11,275,920 B1 | 3/2022 | Sargent et al. | |
| 11,310,400 B2 | 4/2022 | Choi et al. | |
| 11,330,351 B2 | 5/2022 | Su et al. | |
| 11,436,964 B1 | 9/2022 | Wang | |
| 11,476,883 B2 | 10/2022 | Kumar et al. | |
| 11,512,836 B2 | 11/2022 | Rossi et al. | |
| 11,546,453 B2 | 1/2023 | Wang | |
| 2007/0049326 A1 | 3/2007 | Kim | |
| 2009/0066345 A1 | 3/2009 | Klauk et al. | |
| 2013/0307818 A1* | 11/2013 | Pope | G06V 40/1318 345/174 |
| 2013/0313087 A1 | 11/2013 | Le | |
| 2014/0137054 A1 | 5/2014 | Gandhi et al. | |
| 2014/0282285 A1 | 9/2014 | Sadhvani et al. | |
| 2015/0071509 A1* | 3/2015 | Myers | G06V 40/1306 382/124 |
| 2015/0302773 A1 | 10/2015 | Stone et al. | |
| 2015/0309316 A1 | 10/2015 | Osterhout et al. | |
| 2016/0224178 A1* | 8/2016 | Yang | G06F 1/1684 |
| 2016/0282977 A1* | 9/2016 | Moua | G06F 3/044 |
| 2017/0372123 A1 | 12/2017 | Kim et al. | |
| 2018/0082102 A1* | 3/2018 | Lee | G06V 40/1324 |
| 2018/0336391 A1* | 11/2018 | Zhang | H04M 1/0268 |
| 2018/0365466 A1* | 12/2018 | Shim | G06V 40/67 |
| 2019/0179409 A1 | 6/2019 | Jones et al. | |
| 2019/0251325 A1* | 8/2019 | Park | G06V 40/1329 |
| 2019/0311172 A1* | 10/2019 | Kang | G06F 1/3278 |
| 2019/0346687 A1 | 11/2019 | Zheng | |
| 2020/0126243 A1 | 4/2020 | Bleyer et al. | |
| 2020/0174255 A1 | 6/2020 | Hollands et al. | |
| 2020/0174284 A1 | 6/2020 | Chan et al. | |
| 2021/0256244 A1 | 8/2021 | Dinan | |
| 2021/0344675 A1 | 11/2021 | Cui et al. | |
| 2022/0059055 A1 | 2/2022 | Lee et al. | |
| 2022/0100833 A1 | 3/2022 | Koch et al. | |
| 2022/0142136 A1 | 5/2022 | Kubota | |
| 2022/0252893 A1 | 8/2022 | Hsiao | |
| 2022/0283024 A1 | 9/2022 | Neevel et al. | |
| 2022/0284214 A1 | 9/2022 | Tomasetta et al. | |
| 2022/0329678 A1 | 10/2022 | Zhang et al. | |

FOREIGN PATENT DOCUMENTS

| | | |
|---|---|---|
| CN | 208673354 U | 3/2019 |
| CN | 110196528 | 12/2021 |
| EP | 3644337 | 4/2020 |
| JP | 2007114406 | 5/2007 |
| KR | 20100105004 | 9/2010 |
| KR | 20120013400 | 2/2012 |
| KR | 20190107490 | 9/2019 |
| KR | 20200015839 | 2/2020 |
| KR | 20200026000 | 3/2020 |

OTHER PUBLICATIONS

Huang et al., "Eyeglasses-free Display: Towards Correcting Visual Aberrations with Computational Light Field Displays," *ACM Transactions on Graphics*, vol. 33, No. 4, p. 59:1-59:12, Jul. 2014.

Kakadiaris et al., "Multimodal Face Recognition: Combination of Geometry with Physiological Information," *IEEE Computer Society Conference on Computer Vision and Pattern Recognition*, Jun. 2005, VBPR '05, vol. 2, pp. 1022-1029.

Pamplona et al., "Tailored Displays to Compensate for Visual Aberrations," ACM Transactions on Graphics, vol. 31, No. 4, Article 81, Jul. 2012, p. 81:1-81:12.

Sang et al., "Pose-Invariant Face Recognition via RGB-D Images," *Computational Intelligence and Neuroscience*, vol. 2016, Article ID 3563758, Oct. 2015, pp. 1-9.

White et al., "Quantitative Descriptors of Corneal Topography: A Clinical Study," Archives of Ophthalmology, vol. 109, No. 3, Mar. 1991, pp. 349-353.

U.S. Appl. No. 15/853,478, filed Dec. 22, 2017, Sargent et al.
U.S. Appl. No. 16/786,762, filed Feb. 10, 2020, Sargent et al.
U.S. Appl. No. 16/868,215, filed May 6, 2020, Lee et al.
U.S. Appl. No. 17/471,031, 09/09/202, Koch et al.
Kim, "Apple iPhone 12 'notch' disappearing . . . New Face ID test," industry, retrieved from https://nocutnews.co.kr/news/5232116, Oct. 23, 2019, 5 pages.

(56) References Cited

OTHER PUBLICATIONS

Yong, "Analysis of Apple IA Chip," *UPI News*, retrieved from https://www.upinews.kr/newsView/upi201807150003, Jul. 15, 2018, including non-official translation, 22 pages.

\* cited by examiner

ELONGATED FINGERPRINT SENSOR

CROSS-REFERENCE TO RELATED APPLICATIONS

This application is a continuation of U.S. patent application Ser. No. 16/786,762, filed Feb. 10, 2020, which is a continuation of U.S. patent application Ser. No. 15/853,478, filed Dec. 22, 2017, which is a nonprovisional patent application of and claims the benefit of U.S. Provisional Patent Application No. 62/564,046, filed Sep. 27, 2017, the disclosures of which are hereby incorporated herein by reference in their entirety.

FIELD

The described embodiments relate generally to biometric authentication. More particularly, the present embodiments relate to an elongated fingerprint sensor for capturing fingerprint images.

BACKGROUND

The security of computing devices has become a greater concern as such devices incorporate or store more and more personal information. Biometric devices provide a technique to capture user identifying information in a fast manner that maintains the security of the user's personal information.

Certain biometric devices may likewise have a greater application than just security. For example, a fingerprint may not only provide access to a device for a user, but also serve as a token or indicator for the user.

However, biometric sensors may be large and consume space on surfaces of an electronic device, which reduces the area available for user interactions, such as displaying information and receiving input from a user. The consumption of space by a biometric sensor in an undesirable location may increase the size of a device and/or decrease user experience.

SUMMARY

Embodiments described herein relate to an electronic device that incorporates an elongated biometric input device, such as a fingerprint sensor. An elongated biometric input device may facilitate capturing biometric data of a user while allowing for the biometric input device to be slimmer and/or more compact, which may facilitate placing the biometric input device in locations having limited space. For example, an elongated biometric input device may be placed along a side of the electronic device, between a front surface over a display and a back surface.

In an example embodiment, an electronic device includes a housing and a display is positioned at least partially within the housing. The electronic device further includes a fingerprint sensor, which may have a sensor cover defining an input surface. The sensor cover has a length that exceeds a width. A conductive frame surrounds the sensor cover, and the conductive frame is configured to move with the sensor cover in response to an amount of force exerted on the input surface.

A post is coupled to the conductive frame and extends through the housing. A force sensor is configured to output a signal corresponding to the amount of force. A capacitive sensor is positioned below the sensor cover and configured to capture a fingerprint image in response to the amount of force. An isolation member is between the conductive frame and the housing.

In some cases, the sensor cover is lozenge-shaped. The isolation member may include an O-ring and form a liquid seal between the fingerprint sensor and the housing. The fingerprint sensor may be configured to deflect in a direction transverse to the input surface in response to the amount of force on the input surface. A second post may be coupled to the conductive ring, and the first and second post may be coupled to a biasing component configured to return the sensor cover and the conductive frame to an original position in response to removal of the amount of force on the input surface. The sensor cover may be formed from a dielectric material.

In some cases, the fingerprint sensor may be at least partially recessed within the housing and positioned along a side of the housing. The post may be coupled to a stiffener layer within the housing, and the post may cause the stiffener layer to move in response to the amount of force on the input surface. The stiffener layer may be positioned between the post and the force sensor, and the movement of the stiffener layer may cause the force sensor to compress. The compression of the force sensor may cause the force sensor to detect an amount of force exerted on the input surface.

More particularly, force exerted on the input surface may cause the sensor cover and conductive frame to move. Put another way, the fingerprint sensor may move in a direction transverse to the input surface when an input force is exerted. The force may also move the post and the stiffener layer (if present), ultimately being transferred to the force sensor. The force sensor may compress, deflect, move, bend, or otherwise be impacted by the transferred input force. This may cause the force sensor to generate a signal corresponding to an amount of the input force. Typically, this signal is non-binary (e.g., is not simply on or off, or present or absent) such that estimates of the input force may be determined by an associated processor beyond simply whether or not the input force exceeds a threshold.

In another example embodiment, a fingerprint sensor for an electronic device includes a sensor cover defining an input surface having a first length greater than a first width. An isolation member electrically isolates the sensor cover from an adjacent housing. An elongated sensor layer is positioned below the sensor cover and includes an array of capacitive electrodes. The elongated sensor layer has a second length greater than a second width. A circuit layer is positioned below the elongated sensor layer and electrically coupled to the array of capacitive electrodes.

Processing circuitry is coupled to the circuit layer and configured to cause the elongated sensor layer to capture fingerprint data derived from capacitances of the array of capacitive electrodes. The processing circuitry generates an elongated fingerprint image based on the captured fingerprint data, and compares the elongated fingerprint image to a stored fingerprint image. If the elongated fingerprint image matches the stored fingerprint image, the processing circuitry authenticates a user of the electronic device.

In some cases, the array of capacitive electrodes is arranged in a rectilinear pattern of rows and columns with a greater number of columns than rows. The elongated fingerprint image is generated as a result of the greater number of columns than rows. The fingerprint sensor may also include a capacitive force sensor configured to transmit a non-binary force signal to the circuitry layer. In response to the non-binary force signal exceeding a threshold value, the processing circuitry may be configured to cause the elongated sensor layer to capture the fingerprint data.

In another example embodiment, a method of operating an elongated fingerprint sensor includes an operation of detecting, with a force sensor, an amount of force on an input surface. In response to detecting the amount of force, fingerprint data derived from capacitances of an array of capacitive electrodes is captured. An elongated fingerprint image is generated based on the captured fingerprint data. The elongated fingerprint image has a length greater than a width as a result of an arrangement of the array of capacitive electrodes. The elongated fingerprint image is compared to stored fingerprint data. If the elongated fingerprint image corresponds to the stored fingerprint data, the user is authenticated.

In some cases, the detecting the amount of force comprises detecting a non-binary amount of force. The fingerprint data is captured in response to the non-binary amount of force exceeding a threshold. The method may also include receiving a request to access a secured function. In response to authenticating the user, access to the secured function is granted.

BRIEF DESCRIPTION OF THE DRAWINGS

The disclosure will be readily understood by the following detailed description in conjunction with the accompanying drawings, wherein like reference numerals designate like elements.

Figure 1A:
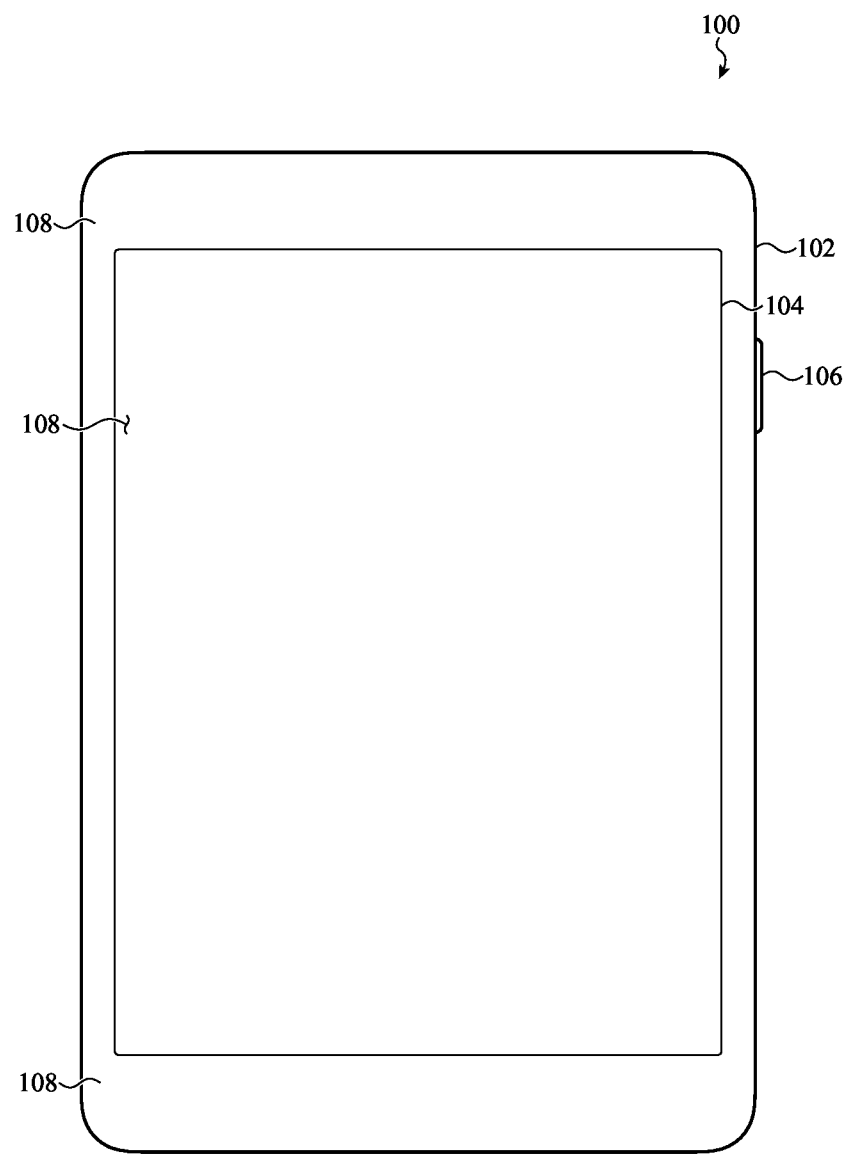
FIG. 1A depicts an electronic device incorporating an elongated fingerprint sensor according to the present disclosure.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

The following disclosure relates to an electronic device incorporating a sensor for detecting biometric information of a user, such as a fingerprint. An elongated biometric sensor may be a two-dimensional sensor having a length which is greater than a width. The elongated shape of the biometric sensor may allow a more compact profile along the shorter dimension than a traditional biometric sensor. As a consequence, the biometric sensor may be placed in a location having a limited width, height, or other constrained dimension, such as along a side of the electronic device. The elongated biometric input device incorporating the biometric sensor, as well as the sensor itself may further facilitate more accurate authentication in a compact package by capturing additional biometric data along its elongated dimension (e.g., length) while maintaining a slim profile along its shorter dimension (e.g., width). As used herein, the "length" and "width" refer to dimensions of the biometric input device (or other input device) along axes other than an axis passing into an interior of the electronic device. The length of the biometric input device generally refers to its greatest dimension, as measured with respect to an exterior surface of the biometric input device, while the width of the button generally refers to its smaller dimension (assuming a rectangular, oval, or lozenge-shaped surface). The input device's height is its offset from a housing of the electronic device (e.g., how proud or recessed the surface of the biometric input device is with respect to the housing).

A biometric input device may take the form of a button incorporating an elongated biometric sensor, such as a fingerprint sensor. The biometric input device may include an input surface for interacting with a user (e.g., biometric data may be detected through the input surface and/or an input force may be applied to the input surface). The input surface may have an elongated shape, such as a lozenge, oblong rectangle, or a similar elongated shape. Due to its slim profile, the elongated biometric input device may be placed on a side (e.g., between a front surface and back surface) of an electronic device, or in another location in which a compact biometric input device is desirable. For example, the elongated biometric input device may be placed along a front surface of an electronic device and allow greater space for user interactions, such as a touch screen or array of keys. In other examples, the elongated biometric input device may be placed on a back surface or another location of an electronic device.

For example, the biometric input device may be incorporated into a tablet computing device having a front surface including a touch-sensitive display visible from outside the housing and positioned at least partially within the housing, a back surface, and a number of sides surrounding the front and back surfaces. An elongated biometric input device may be placed along one of the sides, or along a front or back, of the tablet computing device. An elongated fingerprint sensor incorporated into the elongated biometric input device may capture biometric data while facilitating a thin profile for the tablet computing device.

The elongated biometric input device may be coupled to a housing of the electronic device. The elongated biometric input device includes a sensor cover forming an external surface, which may be surrounded by a conductive frame. The fingerprint sensor may be attached below the cover. In some embodiments, the fingerprint sensor may be a capacitive sensor, while in others the fingerprint sensor may be an ultrasonic sensor, optical sensor, thermal sensor, or the like.

Generally, the biometric input device operates as a movable button, with the conductive frame, sensor cover, and other components of the biometric input device deflecting in response to an input. The biometric input device may be external to the housing of the electronic device (e.g., coupled within a recess of the housing), but the button may be actuated through a force sensor located internal to the housing.

Accordingly, a post may extend from the elongated biometric input device through the housing to transfer force of an input on the elongated biometric input device to the force sensor internal to the housing. In order to provide stability to the movement of the elongated biometric input device, two or more posts may be rigidly coupled to the conductive frame and extend through the housing to be rigidly coupled to a stiffener. As pressure is applied to the biometric input device at the sensor cover and/or conductive ring, the posts and stiffener may deflect, and the deflection of the stiffener may be detected by the internal force sensor (e.g., a dome switch or capacitive force sensor), actuating the internal force sensor.

Actuation of the internal force sensor may cause the electronic device to perform one or more functions. For example, when the force sensor is actuated the elongated biometric input device may capture one or more fingerprint images. It should be appreciated that the term "image," as used herein, encompasses both an actual graphical image of a fingerprint (or portion thereof) as well as a data set representing certain aspects of a fingerprint, such as a hash or other mathematical construct derived from aspects of a user's fingerprints.

The electronic device may authenticate the identity of a user through the capture of the one or more fingerprint images. In some cases, actuation of the button may reference a user request to access the electronic device. In response to this request, the elongated biometric input device may capture a fingerprint image and transmit at least one biometric feature of the user to processing circuitry. The processing circuitry may in turn compare the biometric feature to stored information to determine whether the user is authorized to access the electronic device, and grant access when the biometric feature matches the stored information.

In some embodiments, the processing circuitry may cause the elongated biometric input device to capture biometric data (e.g., a fingerprint image) in response to other actions of a user, software, or the like. For example, one or more secured functions may be defined, in which a user of the electronic device must be authenticated before the secured function may be executed. These may be for access to user-specific data, sensitive data, functions which affect the security of the device, and so on. When a user attempts to initiate execution of a secured function, the processing circuitry may again cause the elongated biometric input device to capture a fingerprint image or other biometric data for authentication (e.g., with or without actuation of the force sensor of the biometric input device). If the captured biometric data indicates the user is authorized, the processing circuitry may execute the secured function.

In an example embodiment, the biometric input device incorporates a fingerprint sensor (or other biometric sensor), which may capture fingerprint data through an array of capacitive electrodes. The array of capacitive electrodes in the fingerprint sensor may operate to capacitively capture a series of nodes. When taken together, these nodes may form a fingerprint image. Typically, all nodes are captured simultaneously rather than sequentially. Put another way, the array of capacitive electrodes generally does not capture multiple sets of nodes temporally that are then stitched or joined together to form a fingerprint image (or other set of fingerprint data) to be compared against a stored fingerprint image (or other set of stored fingerprint data). Thus, the elongated fingerprint sensor may capture a single set of nodes to authenticate a user, unlike a traditional "swipe" sensor that captures multiple images as a user moves his or her finger across the sensor. Thus, unlike with a traditional swipe sensor, embodiments described herein can capture a single set of nodes (or other fingerprint data) as a user presses on the sensor cover. Such capture occurs at a single instant in time rather than requiring multiple sets of data to be captured in succession.

In some fingerprint sensors, the array of capacitive electrodes may be patterned as a square of rectilinear rows and columns to capture a sufficient number of nodes to form a recognizable fingerprint image. However, in the present disclosure a more compact elongated fingerprint sensor may facilitate accurate capture of fingerprint images and other data with an elongated array of capacitive electrodes having fewer rows or columns. As a result, a space-constrained fingerprint sensor with a space-limited number of rows may incorporate an expanded number of columns (or vice versa) over a square-shaped fingerprint sensor in order to capture a sufficient number of nodes to form a recognizable fingerprint image (an elongated fingerprint image).

The fingerprint sensor may also incorporate digital and analog circuitry adjacent the array of capacitive electrodes. The analog and digital circuitry may provide drive signals for the electrode array, as well as capture and/or store signals representing fingerprint nodes. The digital and/or analog circuitry may further be coupled to additional processing circuitry which may control the operation of the fingerprint sensor and receive biometric data for user authentication.

These and other embodiments are discussed below with reference to FIGS. 1A-6. However, those skilled in the art will readily appreciate that the detailed description given herein with respect to these figures is for explanatory purposes only and should not be construed as limiting.

FIG. 1A depicts an electronic device incorporating an elongated biometric input device, such as an elongated fingerprint sensor, according to the present disclosure. In the illustrated embodiment, the electronic device 100 is implemented as a tablet computing device. Other embodiments can implement the electronic device differently. For example, an electronic device can be a smart phone, a laptop computer, a wearable computing device, a digital media player, a kiosk, a stand-alone touch screen display, a mouse, a keyboard, and other types of electronic devices that are configured to capture biometric data, such as a fingerprint image.

The electronic device 100 includes a housing 102 at least partially surrounding a display 104. The housing 102 can enclose, or partially enclose, the display and other internal components of the electronic device 100. The housing 102 can be formed of one or more components operably connected together, such as a front piece and a back piece. Alternatively, the housing 102 can be formed of a single piece operably connected to the display 104.

The display 104 can provide a visual output to the user. The display 104 can be implemented with any suitable technology, including, but not limited to, a liquid crystal display element, a light emitting diode element, an organic light-emitting display element, an organic electroluminescence element, and the like.

A cover sheet 108 may be positioned over the front surface (or a portion of the front surface) of the electronic device 100. In some embodiments, at least a portion of the cover sheet 108 can sense touch and/or force inputs. The cover sheet 108 can be formed with any suitable material, such as glass, plastic, sapphire, or combinations thereof. In some embodiments, touch and force inputs can be received by the portion of the cover sheet 108 that covers the display 104. In some embodiments, touch and/or force inputs can be received across other portions of the cover sheet 108 and/or portions of the housing 102.

Various layers of a display stack (such as the cover sheet 108, display 104, touch sensor layer, force sensor layer, and so on) may be adhered together with an adhesive and/or may be supported by a common frame or portion of the housing 102. A common frame may extend around a perimeter, or a portion of the perimeter, of the layers, may be segmented around the perimeter or a portion of the perimeter, or may be coupled to the various layers of the display stack in another manner.

In some embodiments, each of the layers of the display stack may be attached or deposited onto separate substrates that may be laminated or bonded to each other. The display stack may also include other layers for improving the structural or optical performance of the display 104, including, for example, polarizer sheets, color masks, and the like. Additionally, the display stack may include a touch and/or force sensor layer for receiving inputs on the cover sheet 108 of the electronic device 100.

Figure 1B:
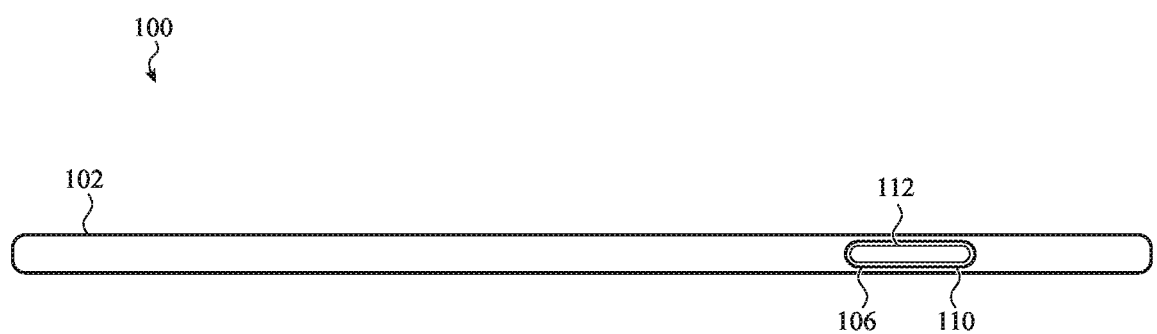
FIG. 1B depicts a side view of the electronic device of FIG. 1A.

FIGS. 1A and 1B are described with respect to an electronic device incorporating a display 104 and a cover sheet 108; other embodiments may omit the display 104 and/or the cover sheet 108. For example, an elongated biometric input device 106 may be incorporated into an electronic device such as a keyboard, a mouse, or another portable device without a display 104. In some examples, the cover sheet 108 may also be omitted and the housing 102 may be unitary, or the housing 102 may include an aperture for a display 104 and lack a cover sheet 108.

In many cases, the electronic device 100 can also include a processor, memory, power supply and/or battery, network connections, sensors, input/output ports, acoustic components, haptic components, digital and/or analog circuits for performing and/or coordinating tasks of the electronic device 100, and so on. For simplicity of illustration, the electronic device 100 is depicted in FIGS. 1A and 1B without many of these components, each of which may be included, partially and/or entirely, within the housing 102. Examples of such components are described below with respect to FIG. 5.

The electronic device may receive biometric data from a user, such as through an elongated biometric input device 106. In some embodiments, the biometric input device 106 can be coupled to the housing 102. The biometric input device 106 may be a mechanical button, a soft button (e.g., a button that does not physically move but still accepts inputs), an icon or image on a display, and so on.

The biometric input device 106 may be disposed in an opening or aperture formed in the housing 102. In some embodiments, the aperture extends through the housing 102 and one or more components of the biometric input device 106 are positioned in the housing. In some embodiments, the housing 102 defines a recess to retain the biometric input device 106, and may additionally include one or more apertures through which a component of the biometric input device 106 extends through the housing 102.

FIG. 1B depicts a side view of the electronic device of FIG. 1A. The electronic device 100 includes a biometric input device 106, which may be partially or entirely recessed within the housing 102. The biometric input device 106 includes a sensor cover 112, which may be a dielectric cover, that is surrounded by a conductive frame 110. The conductive frame 110 may be a ring of conductive material.

The sensor cover 112 (e.g., dielectric cover) may define an external surface of the electronic device 100, which may come in contact with an object, such as a user's finger. When a finger contacts the external surface of the sensor cover 112, the skin of the finger may become at least partially flattened over the external surface, though this is not required. With the skin of the finger in contact with the external surface of the sensor cover 112, sensors below the sensor cover 112 may capture biometric information, such as a fingerprint image. The sensors may be organized into a sensor layer, as discussed in more detail below.

In an example embodiment, the biometric input device 106 may be a capacitive fingerprint sensor; the fingerprint sensor may be a sensor layer in the stack up of the biometric input device. The capacitive fingerprint sensor may include an array of capacitive electrodes which may be driven by an electrical signal. In some embodiments, a user's finger may also come in contact with the conductive frame 110, which may be held at a reference voltage level, such as a ground. Other embodiments can use different types of sensing technologies. For example, ultrasonic, infrared, multi-spectral, RF, thermal, optical, resistance, and piezoelectric technologies can be used instead of, or in addition to, capacitive sensing.

In some embodiments, a biometric input device 106 may receive additional inputs. For example, the biometric input device 106 may use capacitive or similar sensing to sense touch and/or gesture inputs on the sensor cover 112. Accordingly, the biometric input device 106 may be configured to capacitively detect a motion of a finger across the sensor cover 112, such as a swipe along a length of the sensor cover 112. In response to such gestures, the electronic device 100 may perform a function, such as a change in volume, a change in brightness of the display 104, opening an application, changing another setting of the electronic device 100, and so on.

Figure 2:
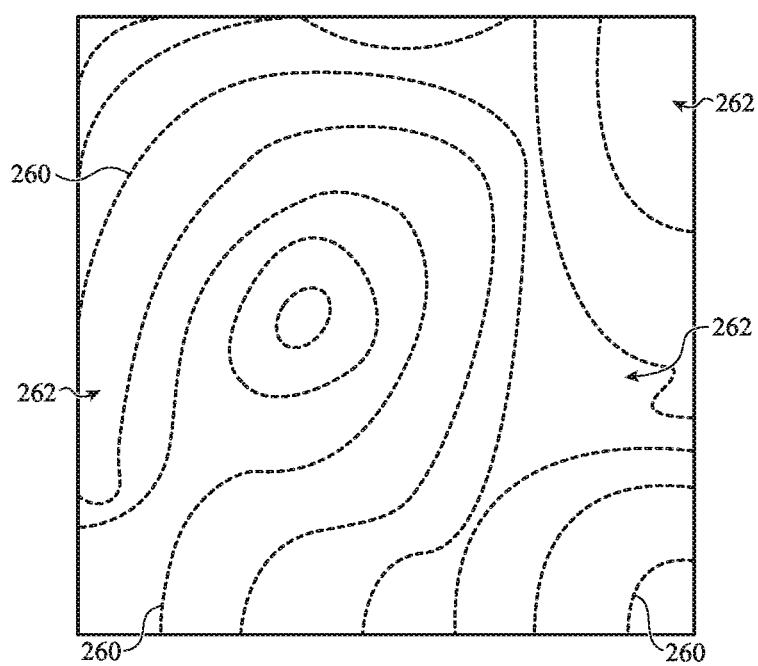
FIG. 2 is a graphic illustration of a portion of a fingerprint image.

A fingerprint is generally formed from ridges and valleys arranged in a unique pattern. FIG. 2 depicts a graphic illustration of a portion of a fingerprint image. In FIG. 2, the ridges 260 are represented with dashed lines. The valleys 262 are located in the areas between the ridges 260. Typically, the capacitance measured between a ridge 260 and an electrode in the fingerprint sensor varies from the capacitance measured between a valley 262 and another electrode in the fingerprint sensor. As previously mentioned, the elongated fingerprint sensor(s) described herein capture, at a single time, a single image that is compared against a stored image in order to authenticate a user or otherwise execute functionality of the electronic device, rather than capturing a series of images as a user moves his or her finger across the sensor.

The measured capacitance between a ridge and an electrode in the fingerprint sensor can be greater than the measured capacitance between a valley and another electrode in the fingerprint sensor because the ridge is closer to the electrodes. The differences in the measured capacitances can be used to distinguish between ridges and valleys and produce or generate a fingerprint image.

It should be appreciated that alternative fingerprint sensing technologies may measure fingerprints differently, and it should be further appreciated that these alternative fingerprint sensing technologies may be used or incorporated into embodiments described herein. For example, ultrasonic, optical, inductive and/or thermal fingerprint sensing technologies may be used with various embodiments described herein instead of capacitive sensing.

As used herein, the term "image" or "fingerprint image" includes an image and other types of data that can be captured by a fingerprint sensor (which may be a sensor layer) and/or used to represent a fingerprint. By way of example only, a fingerprint sensor can produce a data structure that defines the features in a fingerprint. In some embodiments, multiple images of various portions of a fingerprint can be combined to create a composite image.

For example, a fingerprint image may be considered to be made up of several nodes, with each node representing a region of the fingerprint image. Nodes may generally be overlapping, such that the nodes may be stitched together to form an entire fingerprint image. One or more electrodes in the fingerprint sensor/layer may capture a node. One or more nodes may be matched with data stored in memory, such as a fingerprint template, to authenticate a user's access to features of the electronic device. For example, nodes captured by the fingerprint sensor may be compared to stored nodes of the fingerprint template, or a captured fingerprint image may otherwise be compared to a stored fingerprint image. Such comparison may be of the overall captured image to the overall stored image, of nodes of the captured image to nodes of the storied image, of a hash or other mathematical representation or abstraction of the captured image to a hash or other mathematical representation or abstraction of the stored image, of a portion of the captured image to a portion of the stored image, and so on. All of the foregoing is embraced by the concept of comparing a captured fingerprint image (or captured fingerprint data) to a stored fingerprint image (or stored fingerprint data). While multiple nodes and/or images may be captured to create the fingerprint template, during an authentication operation a single set of nodes is typically captured by the sensor. Further, this single set of nodes is captured in one capture operation at a single instant in time, rather than across multiple capture operations.

Returning to FIG. 1B, the biometric input device 106 may be formed as a compressible button. Accordingly, the conductive frame 110, the sensor cover 112, and other components of the biometric input device may deflect in response to force on the sensor cover 112 and/or the conductive frame. The biometric input device 106 may incorporate a pressure- or force-sensing component to register the application of force. For example, an electrical switch may cause an actuation signal to be produced in response to the application of sufficient force to the biometric input device 106.

In response to the actuation signal, the electronic device 100 may initiate a process. For example, the fingerprint sensor in the biometric input device 106 may be activated to capture a fingerprint image in response to the actuation signal, without requiring the user to move his or her finger, for example as a single set of nodes (or other fingerprint data) captured at a single time. In other examples, the actuation signal may additionally or alternatively cause another action, such as a software action, power on or power off of the electronic device 100, a change in volume, or another action.

In some embodiments, the biometric input device 106 may incorporate a non-binary force sensor, or a force sensor which measures an amount of force with a range of values. In other words, the force sensor may exhibit a non-binary electrical response (e.g., a change in voltage, capacitance, resistance, or other electrical parameter) indicating the amount of force applied to the biometric input device 106. This non-binary response may yield or be a non-binary signal that conveys information corresponding to an amount of force exerted on an input surface, such as one defined by the sensor cover, and is not limited to being present or absent (e.g., on/off).

For example, the biometric input device 106 may incorporate a force sensor which can distinguish between three or more force values, and may respond differently to different threshold values of force. As one example, no action may occur below a first threshold force value. Between the first threshold force value and a second threshold force value, the biometric input device 106 may capture one or more fingerprint images. Above the second threshold force value, the electronic device 100 may power off. It should be understood that a variety of actions may result from the application of varying amounts of force, and that the above illustrations are exemplary in nature.

Figure 5:
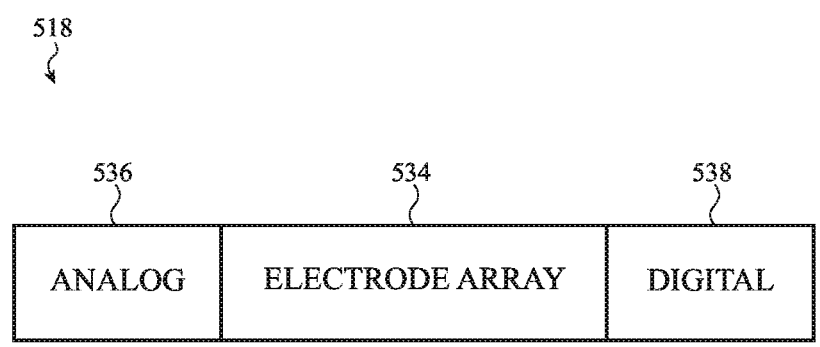
FIG. 5 depicts a schematic view of a fingerprint sensor including an array of electrodes, analog circuitry, and digital circuitry.
Figure 6:
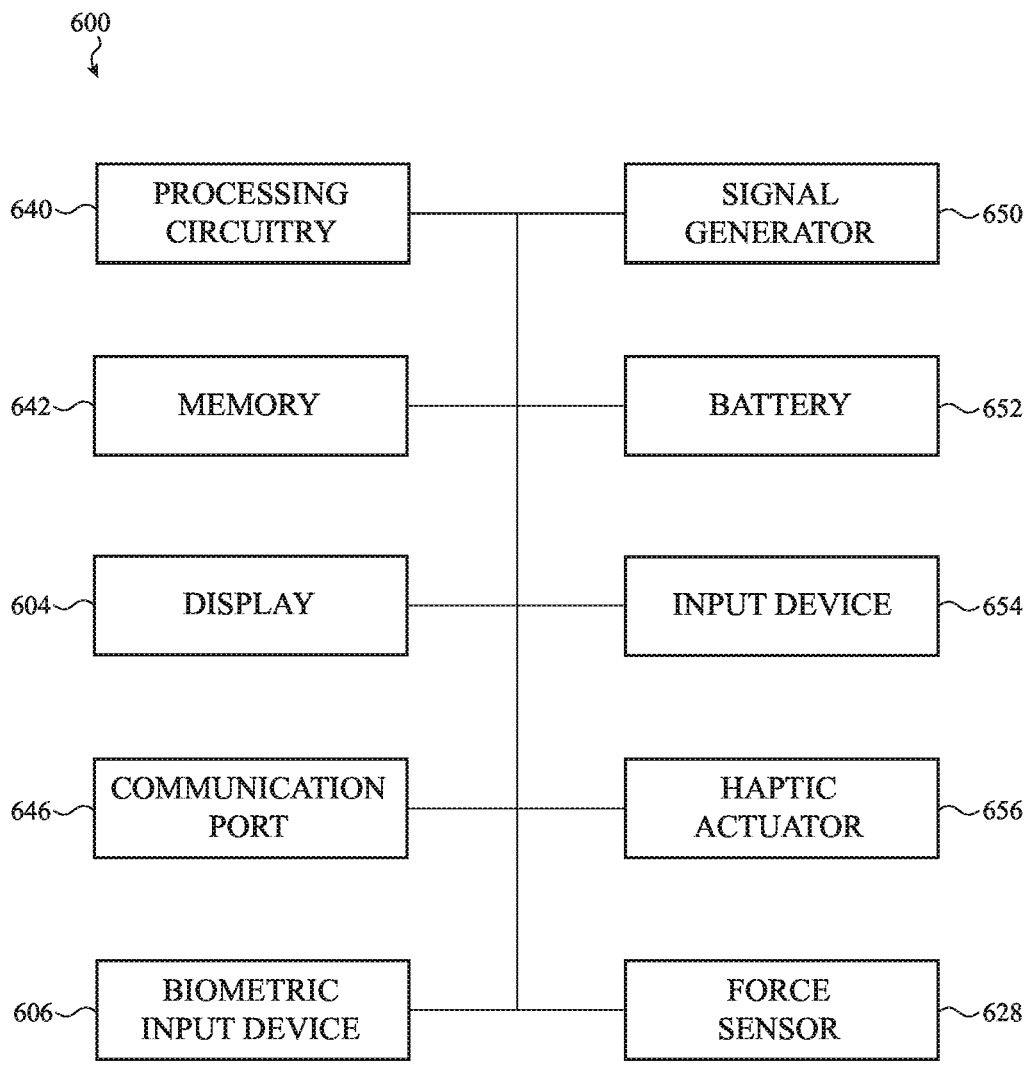
FIG. 6 depicts example components of an electronic device in accordance with the embodiments described herein.

Examples of the biometric input device 106 are further described below with respect to FIGS. 3A-4C. A schematic view of a sample biometric sensor (here, a fingerprint sensor) is described below with respect to FIG. 5, illustrating an electrode array and analog and digital circuitry for capturing a fingerprint image. FIG. 6 depicts a schematic view of various components of an electronic device incorporating a biometric input device.

Figure 3A:
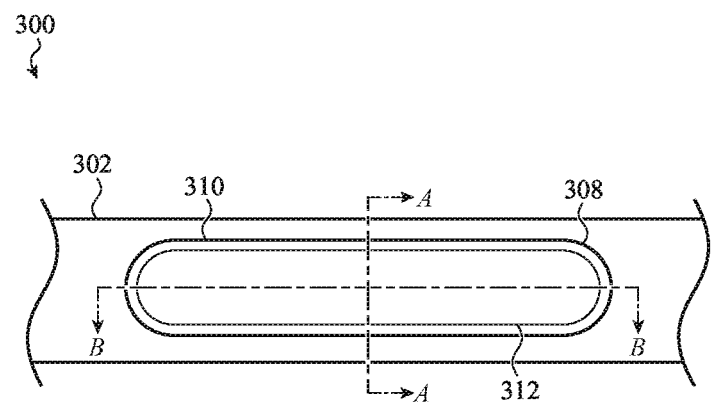
FIG. 3A depicts an example biometric input device incorporating an elongated fingerprint sensor.
Figure 3B:
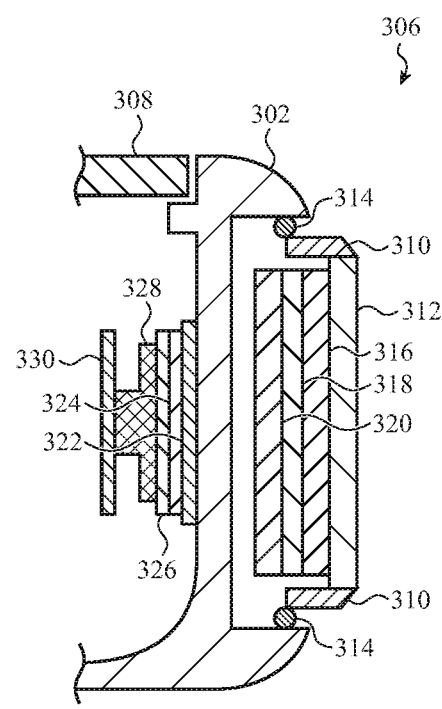
FIG. 3B depicts a cross-sectional view of the biometric input device of FIG. 3A, taken along section A-A.
Figure 3C:
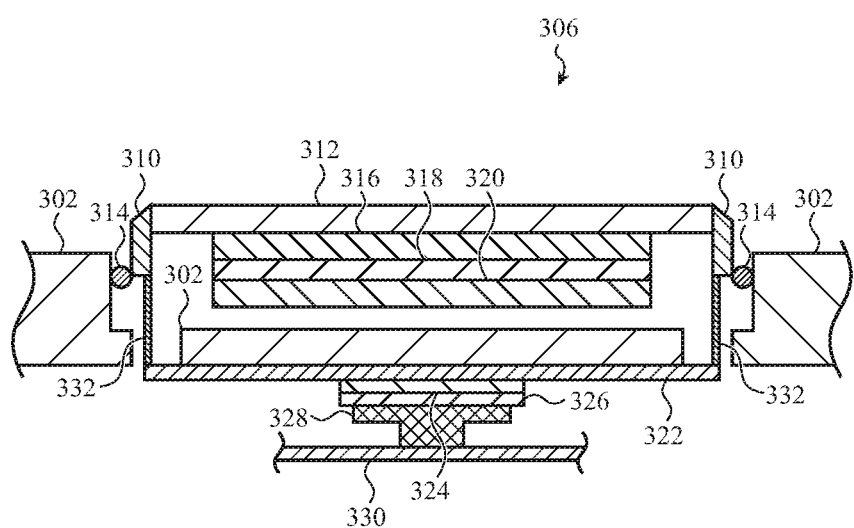
FIG. 3C depicts a cross-sectional view of the biometric input device of FIG. 3A, taken along section B-B.

FIGS. 3A-3C depict an example biometric input device incorporating an elongated fingerprint sensor. An elongated biometric input device 306 may have a sensor cover defining an input surface with a length greater than a width, facilitating placement of the biometric input device 306 within a limited space. FIGS. 3A-4C are described with respect to a biometric input device 306 incorporated into a side of a tablet computer, but other embodiments may incorporate an elongated biometric input device 306 differently.

For example, an elongated biometric input device 306 may be incorporated into a side of a mobile phone, or along a front or back surface of the mobile phone. In another example, an elongated biometric input device 306 may be incorporated into a keyboard in a space above, below or between keys, into a laptop computer, on a surface of a mouse, on a portion of a wearable computing device, or another location on an electronic device 300 with limited space along a dimension.

The biometric input device 306 includes a sensor cover 312 surrounded by a conductive frame 310. The sensor cover may be formed from a dielectric material that facilitates capacitive coupling between an object exerting an input force (such as a user's finger or a stylus) and a biometric sensor located beneath the cover (e.g., toward an interior of the electronic device 300). Generally, the cover 312 defines an input surface through which biometric data is detected, and may additionally be a surface at which a user applies a normal force (a force in a direction transverse to the input surface) to operate the biometric input device 306 as a button. An elongated biometric input device 306 incorporates a sensor cover 312 with a length greater than a width, as defined across the input surface. In the example embodiment of FIG. 3A, the sensor cover 312 may have a lozenge shape, and the conductive frame 310 may form an oval ring around the sensor cover 312.

FIG. 3B depicts a cross-sectional view of the biometric input device 306 taken along section A-A. As shown in FIG. 3B, the biometric input device 306 may be at least partially recessed within the housing 302 of the electronic device 300. The housing 302 may include a shelf or other support structure for supporting a cover sheet 308.

The biometric input device 306 may include a sensor cover 312 and a sensor layer 318. The sensor cover 312 may be any appropriate dielectric or otherwise non-conductive material, such as glass, sapphire, ceramic, plastic, acrylic, or combinations of such materials. In some embodiments, the sensor cover 312 may be formed from a material which is at least partially transparent, though this is not necessary and opaque materials may also be used. A color masking layer may be included between the sensor cover 312 and the sensor layer 318 to reduce visibility of the biometric sensor to a user.

The sensor layer 318 may be coupled to the sensor cover 312 by an adhesive layer 316. The adhesive layer 316 may include a pressure-sensitive adhesive, or another adhesive which adheres the sensor cover 312 to the sensor layer 318. The sensor layer 318 may include an array of capacitive electrodes disposed over a substrate (e.g., silicon or another appropriate material). Analog and/or digital circuitry may be electrically coupled to the array of capacitive electrodes to control the operation of the electrodes and receive biometric data. In some embodiments, the sensor layer 318 may include the analog and/or digital circuitry (see FIG. 5, described further below), and in other embodiments the analog and/or digital circuitry may be provided on another layer or separate from the biometric input device 306. The sensor layer 318 may be disposed within the conductive frame 310, and may not come into contact with the conductive frame 310.

A circuit layer 320, such as a flexible circuit, connects the sensor layer 318 to additional processing circuitry. As an example, the circuit layer 320 can connect the sensor layer 318 to additional processing circuitry to transmit signals to or from the fingerprint sensor. In some embodiments, some of the additional processing circuitry can be disposed in the circuit layer 320.

The conductive frame 310 may surround and support the components of the biometric input device 306. When a force is applied to the sensor cover 312 and/or the conductive frame 310, the conductive frame 310 may deflect, moving the sensor cover 312 and other components into a cavity of the housing 302. In some embodiments, the conductive frame 310 may be formed from a material sufficiently rigid to provide structural support to the sensor cover 312. The conductive frame 310 may therefore be formed from an appropriate material, such as steel, aluminum, brass, nickel, and other conductive materials or combinations of materials.

In addition, the conductive frame 310 may be coupled to a reference voltage, such as system ground. When a user contacts the conductive frame 310, the coupling to ground may reduce signal attenuation due to variable capacitive coupling between the user and the system ground as a result of other fingers, hands, or body parts coming in contact with other parts of the electronic device 300.

An isolation member 314 may be positioned between (and abutting both) the housing 302 and the conductive frame 310 in order to electrically isolate the conductive frame 310 and/or other components of the biometric input device 306 from the housing 302. For example, the housing 302 may be formed from a conductive material, such as aluminum, steel, or other metals. In such cases, the isolation member 314 may further reduce signal attenuation in biometric data captured by the biometric input device 306 by electrically isolating the conductive frame 310 and the fingerprint sensor (or at least the sensor cover) from the housing 302.

The isolation member 314 may be affixed to the conductive frame 310 in some embodiments, and may be affixed to the housing 302 or other components of the electronic device 300 in other embodiments. For example, if the conductive frame 310 is omitted then the isolation member may be affixed to the sensor cover. The isolation member 314 may be any appropriate non-conductive material which may be positioned between the housing 302 and the conductive frame 310, such as a rubber O-ring, a plastic bead, a compliant gasket, adding a hard coating to the conductive frame 310 and/or the housing 302, and so on.

In some cases, isolating the conductive frame 310 from the housing 302 may be achieved by another technique, such as a film or surface treatment of the housing 302 and/or the conductive frame 310. For example, an anodization layer may be formed in the portion of the housing 302 around the biometric input device 306. The anodization layer may be formed at a sufficient thickness to electrically isolate the conductive frame 310 from the housing 302 and hold up to wear. In other examples, the housing 304 may be formed from a non-conductive material, such as glass or plastic, and the isolation member 314 may be omitted.

In some embodiments, but not necessarily all, the biometric input device 306 may be movable within a recess in the housing 302 of the electronic device 300. Accordingly, the isolation member 314 may be operable to facilitate movement of the biometric input device 306 while electrically isolating the conductive frame 310 from the housing 302.

In some embodiments, the isolation member 314 may additionally provide a seal between the housing 302 and the biometric input device 306. The isolation member 314 may accordingly provide a liquid and/or dust seal, which may inhibit or prevent the entry of liquids or other contaminants within the biometric input device 306 and/or the housing 202 of the electronic device 300. In such examples, the isolation member 314 may be a compliant member, such as a rubber or polymer O-ring or gasket.

As depicted in FIG. 3C, the conductive frame 310 may be coupled to a stiffener layer 322. FIG. 3C depicts a cross-sectional view of the biometric input device of FIG. 3A, taken along section B-B. The biometric input device 306 is coupled to the stiffener layer 322 to transfer force applied to the sensor cover 312 to a force sensor 328.

In some embodiments, the force sensor 328 is disposed within the housing 302 of the electronic device 300. Accordingly, one or more apertures may be formed within the housing 302, through which one or more posts 332 or other structural components may pass to couple the conductive frame 310 to the stiffener layer 322 or directly to the housing 302.

The conductive frame 310, posts 332, and stiffener layer 322 may be formed of the same or different materials, and may be coupled together by an appropriate technique, such as welding, soldering, brazing, an adhesive, a mechanical coupling (e.g., the posts 332 may be screws or studs which pass through the stiffener layer 322 and into the conductive frame 310), and so on. As depicted in FIG. 3C, some embodiments may include two (or more) posts 332 in order to provide additional stability to the movement of the biometric input device 306. In other embodiments one or more posts 332 may pass through the housing 302, coupling the conductive frame 310 to the stiffener layer 322.

The stiffener layer 322 generally provides a rigid structure through which force may be transferred to the force sensor 328. In some embodiments, the stiffener layer 322 may include a metal (which may be the same or a different metal from the conductive frame 310), and in other embodiments the stiffener layer 322 may be formed from glass, plastic, sapphire, or another material.

The stiffener layer 322 may be coupled to a switch circuit layer 326 by an adhesive layer 324 (which may be the same or a different adhesive as the adhesive layer 316). The switch circuit layer 326 may be a flexible circuit coupled to the force sensor 328, and may provide signals to and from the force sensor 328. The switch circuit layer 326 may further be coupled to the circuit layer 320 (for example, the switch circuit layer 326 and the circuit layer 320 may be formed as a single flexible circuit, connected to one another by vias or flex circuits, or otherwise electrically and/or physically coupled together) and/or processing circuitry. Accordingly, the operation of the fingerprint sensor may be controlled or affected by actuation of the force sensor 328.

The force sensor 328 may be positioned near a structural component 330 of the electronic device 300. In an example embodiment, the force sensor 328 may be an electrical switch, such as a compressible dome switch. As force is applied to the sensor cover 312, the force may be transferred from the conductive frame 310, through the posts 332 to the stiffener layer 322, and from the stiffener layer through the adhesive layer 324 and the switch circuit layer 326 to the force sensor 328.

The force sensor 328 may include a compliant and/or biasing component, such as a compressible dome, spring, beam, or other structure. When force is transferred from the stiffener layer 322 to the force sensor 328, the biasing component may come in contact with the structural component 330 and compress. In some embodiments (although not all), as the biasing component collapses it completes an electrical circuit, thereby causing an actuation signal to be generated or otherwise sent to processing circuitry and/or the sensor layer 318. When an input on the sensor cover 312 is released, the compressible dome may provide a restoring force, returning at least the sensor cover and conductive frame of the biometric input device 306 to their original positions.

In other embodiments, the force sensor 328 may be implemented as another type of switch or force sensing device. For example, the force sensor 328 may detect a non-binary amount of force through capacitive force sensing, ultrasonic force sensing, strain gauge, optical, resistance, and piezoelectric technologies. The force sensor 328 may in some examples output a range of signal voltages to processing circuitry, and in other examples may additionally or alternatively provide actuation signals at given force thresholds.

Figure 4A:
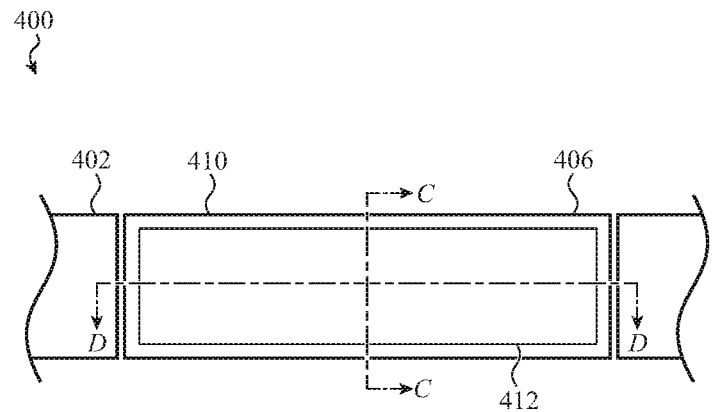
FIG. 4A depicts another example biometric input device incorporating an elongated fingerprint sensor.
Figure 4B:
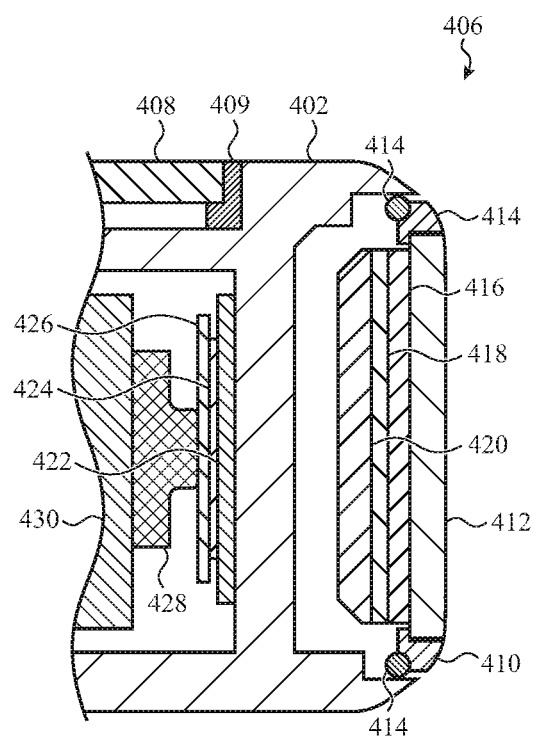
FIG. 4B depicts a cross-sectional view of the biometric input device of FIG. 4A, taken along section C-C.
Figure 4C:
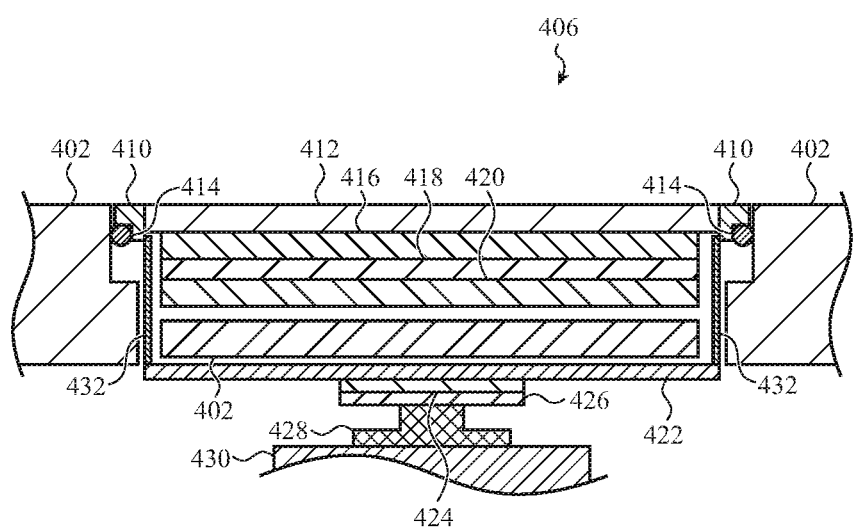
FIG. 4C depicts a cross-sectional view of the biometric input device of FIG. 4A, taken along section D-D.

FIGS. 4A-4C depict another example biometric input device incorporating an elongated fingerprint sensor. An elongated biometric input device 406 may have an input surface with a length greater than a width, facilitating placement of the biometric input device 406 within a limited space, such as along the side of a tablet computing device. The biometric input device 406 may be an oblong rectangle (e.g., a rectangle having a greater length than a width as defined across the input surface of the biometric input device 406), and may in some embodiments by flush or nearly flush with the external surface of a surrounding housing 402.

Similar to the example in FIGS. 3A-3C, the biometric input device 406 includes a sensor cover 412 surrounded by a conductive frame 410. Here, the sensor cover 412 and the conductive frame 410 may be rectangular in shape, though any geometric shape may be adapted for use in examples similar to FIGS. 3A-4C. The conductive frame 410 may surround and support the components of the biometric input device 406, and may deflect in response to a force on the sensor cover 412 and/or the conductive frame 410.

FIG. 4B depicts a cross-sectional view of the biometric input device of FIG. 4A, taken along section C-C. As depicted in FIG. 4B, the biometric input device 406 may be at least partially recessed within the housing 402. The biometric input device 406 may be movable within a recess in the housing 402 of the electronic device 400, and may be flush with the external surface of the housing 402 on either side of the biometric input device 406 when not depressed.

An isolation member 414 may be placed between the conductive frame 410 of the biometric input device 406 and the housing 402, electrically isolating the conductive frame 410 from the housing 402. In some examples, the isolation member 414 may additionally seal the housing 402 from external contaminants, including operating as a liquid seal.

The housing 402 may include a shelf or other support structure for supporting a cover sheet 408 and other components of a display. Likewise, the display may be positioned within, or at least partially within, the housing. A gasket 409 (such as an O-ring), adhesive, or similar material may affix the housing 402 to the cover sheet 408, and may additionally form a liquid or other seal.

The biometric input device 406 may include a sensor cover 412 placed over a sensor layer 418. The sensor cover 412 and the sensor layer 418 may be similar to those described above with respect to FIGS. 3A-3C. The sensor layer 418 may be coupled to the sensor cover 412 through an adhesive layer 416, such as a pressure-sensitive adhesive. The sensor layer 418 may include an array of capacitive electrodes. Analog and/or digital circuitry may be electrically coupled to the array of capacitive electrodes to control the operation of the electrodes and receive biometric data. In some embodiments, the sensor layer 418 may include the analog and/or digital circuitry.

A circuit layer 420, such as a flexible circuit, connects the sensor layer 418 to additional processing circuitry. As an example, the circuit layer 420 can connect the sensor layer 418 to additional processing circuitry to transmit signals to or from the fingerprint sensor. In some embodiments, some of the additional processing circuitry can be disposed in the circuit layer 420.

As depicted in FIG. 4C, the conductive frame 410 may further be coupled to a stiffener layer 422. FIG. 4C depicts a cross-sectional view of the biometric input device of FIG. 4A, taken along section D-D. The biometric input device 406 is coupled to the stiffener layer 422 to transfer force applied to the sensor cover 412 to a force sensor 428.

In some embodiments, the force sensor 428 is disposed on a structural component 430 within the housing 402 of the electronic device 400. One or more apertures may be formed within the housing 402, through which one or more posts 432 may pass to couple the conductive frame 410 to a stiffener layer 422. The stiffener layer 422 may provide a rigid material to contact and deform the force sensor 428.

The stiffener layer 422 may be coupled to a switch circuit layer 426 through an adhesive layer 424 (e.g., the same or a different adhesive as the adhesive layer 416). The switch circuit layer 426 may be a flexible circuit coupled to the force sensor 428, and may provide signals to and from the force sensor 428. The switch circuit layer 426 may further be coupled to the circuit layer 420 (e.g., the switch circuit layer 426 and the circuit layer 420 may be formed as a single flexible circuit or otherwise coupled together) and/or processing circuitry. Accordingly, the operation of the fingerprint sensor may be controlled or affected by actuation of the force sensor 428.

As force is applied to the sensor cover 412, the force may be transferred from the conductive frame 410, through the posts 432 to the stiffener layer 422, causing the stiffener layer 422 to move toward the force sensor 428. In an example embodiment, the force sensor 428 may be a compliant electrical switch, such as a compressible dome switch, which may compress as the stiffener layer 422 comes in contact with the force sensor 428.

As the dome of the force sensor 428 compresses, an actuation signal may be transferred to the switch circuit layer 426, which may be transmitted to processing circuitry and/or the sensor layer 418. Similar to FIG. 3C, in other embodiments, the force sensor 428 may be implemented as another type of switch or force sensing device, such as a capacitive force sensor capable of detecting non-binary amounts of force.

FIG. 5 depicts a schematic view of a fingerprint sensor including an array of electrodes, analog circuitry, and digital circuitry. A sensor layer 518 may include an electrode array 534, which may capture fingerprint nodes and/or images through measuring capacitance changes in the electrodes. Capacitance changes in the electrode array 534 may in some cases indicate additional inputs, such as gesture inputs. The sensor layer 518 may operate to capacitively capture a series of images, or nodes. When taken together, these nodes may form a fingerprint. The full set of nodes may be referred to herein as a "mesh."

Each node in the mesh may be separately captured by the electrode array 534. Generally, there is some overlap between images in nodes representing adjacent portions of a fingerprint. Such overlap may assist in assembling the fingerprint from the nodes, as various image recognition techniques may be employed to use the overlap to properly identify and/or align adjacent nodes in the mesh. In some examples, capacitance changes in the electrode array 534 may indicate additional inputs, such as gesture inputs.

Digital circuitry 538 and analog circuitry 536 may control the sensor layer 518, providing drive signals and measuring capacitive responses to the drive signals. For example, the digital circuitry 538 may send and receive signals from additional processing circuitry, such as a processor. The analog circuitry 536 may drive the electrode array and/or measure analog levels of capacitance (e.g., analog capacitance values) of each electrode in the electrode array 534. The analog circuitry 536 may further include filters, amplifiers, and other circuitry to condition captured fingerprint signals.

The captured fingerprint signals may be converted to digital fingerprint data and further processed by the digital circuitry 538. The digital circuitry 538 may temporarily store the captured fingerprint data, and transmit the captured fingerprint data to processing circuitry. In some embodiments, the data is relayed from the digital circuitry 538 to processing circuitry directly. In some embodiments, the digital circuitry 538 may encrypt the captured fingerprint data prior to transmitting to the processing circuitry.

The processing circuitry may accordingly receive the encrypted fingerprint data, decrypt the fingerprint data, and search for a match in a stored template library. Generally, fingerprint data or nodes of a finger may be matched to stored fingerprint data in the template library. For example, the sensor layer 518 may not provide data at once representing an entire fingerprint image, but may provide fingerprint data representing a node (e.g. a portion of a fingerprint), or a first set of nodes. The processing circuitry may match the node with data (e.g., a fingerprint image, a node, or a second set of nodes) stored in the template library to find a match. The processing circuitry may provide a signal indicative of a match, or lack thereof, and the electronic device may take an action such as granting or denying access to a feature of the device.

The width limitations of the sensor layer 518 may limit the ability of the electrode array 534 to accurately capture fingerprint nodes. Accordingly, the sensor layer 518 and/or the electrode array 534 may be elongated. An elongated electrode array 534 may include additional electrodes along a length of the electrode array 534. With the elongated electrode array 534, additional nodes may be captured to ensure accurate capturing and matching of fingerprint nodes.

For example, the electrode array 534 may be patterned into rectilinear rows and columns. An electrode array 534 may be elongated by including additional columns, which may enable the electrode array 534 to capture a sufficient number of nodes to form a recognizable fingerprint image.

Accordingly, the electrode array 534 may extend along a majority of a width of the elongated sensor layer 518, and analog circuitry 536 and digital circuitry 538 may be positioned adjacent the electrode array 534. FIG. 5 depicts the analog circuitry 536 along a first side of the electrode array 534 (e.g., adjacent a first column of the electrode array 534), and digital circuitry 538 along an opposite side (e.g., adjacent a last column of the electrode array 534). In other embodiments, the relative positions of the analog circuitry 536 and digital circuitry 538 may be reversed. In some embodiments, both analog circuitry 536 and digital circuitry 538 may be placed on a same side (e.g., adjacent a first or last column of the electrode array 534), or mixed analog and digital circuitry may be placed along both sides of the electrode array 534.

In still other embodiments, a portion of the analog circuitry 536 and/or the digital circuitry 538 may be placed along the top and/or bottom of the electrode array 534. While this may reduce the width of the electrode array 534, it may further increase the processing ability of the analog circuitry 536 and/or digital circuitry 538.

The electrode array 534, analog circuitry 536, and digital circuitry 538 may each be disposed over a substrate. In some embodiments, the electrode array 534, analog circuitry 536, and digital circuitry 538 may be disposed on a common substrate, such as a silicon wafer. The electrode array 534, analog circuitry 536, and digital circuitry 538 may be formed by an appropriate means, such as vapor deposition, sputtering, and other appropriate techniques. In other embodiments, the electrode array 534, analog circuitry 536, and digital circuitry 538 may be formed on separate substrates and electrically coupled together.

FIG. 6 depicts example components of an electronic device in accordance with the embodiments described herein. The schematic representation depicted in FIG. 6 may correspond to components of the devices depicted in FIGS. 1A-5, described above. However, FIG. 6 may also more generally represent other types of electronic devices with an integrated input/output module that receives touch and force inputs and provides localized deflection at a surface.

As shown in FIG. 6, a device 600 includes a biometric input device 606 which may detect biometric data of a user. In an example embodiment, the biometric input device 606 may be a capacitive fingerprint sensor. A capacitive fingerprint sensor may include an array of capacitive electrodes which may be driven by an electrical signal and configured to detect the ridges and valleys of a finger which comes in contact with the biometric input device 606.

A fingerprint is generally formed from ridges and valleys arranged in a unique pattern. The biometric input device 606 may measure a capacitance between a ridge and an electrode in the fingerprint sensor, and measure a distinct capacitance between a valley and another electrode in the fingerprint sensor. The differences in the measured capacitances can be used to distinguish between ridges and valleys and produce a fingerprint image.

It should be appreciated that alternative fingerprint sensing technologies may measure fingerprints differently, and it should be further appreciated that these alternative fingerprint sensing technologies may be used or incorporated into embodiments described herein. For example, ultrasonic, optical, inductive and/or thermal fingerprint sensing technologies may be used with various embodiments described herein instead of capacitive sensing.

In some embodiments, the biometric input device 606 may additionally be operable as a touch sensor. For example, the biometric input device 606 may be a capacitive fingerprint sensor which may also detect a presence and location of an object on its surface. The biometric input device 606 may further sense gesture inputs. For example, the biometric input device 606 may detect a swipe gesture along a length of the sensor cover, which may initiate a function such as a change in volume, a change in brightness of the display 604, opening an application, changing another setting of the device 600, and so on.

The device 600 also includes a force sensor 628, which may be physically coupled to the biometric input device 606. The force sensor 628 may register the application of force to the biometric input device 606. For example, an electrical switch may cause an actuation signal to be produced in response to the application of sufficient force to the biometric input device 606.

In response to the actuation signal, the processing circuitry 640 may initiate a process. For example, the fingerprint sensor in the biometric input device 606 may be activated to capture one or multiple fingerprint images in response to the actuation signal. In other examples, the actuation signal may additionally or alternatively cause another action, such as a software action, power on or power off of the device 600, a change in volume, or another action.

In some embodiments, the force sensor 628 may be a non-binary force sensor, or a force sensor which measures an amount of force with a range of values. In other words, the force sensor may exhibit a non-binary electrical response (e.g., a change in voltage, capacitance, resistance, or other electrical parameter) indicating the amount of force applied to the biometric input device 606.

For example, the force sensor 628 may distinguish between three or more force values, and may respond differently to different threshold values of force. As one example, no action may occur below a first threshold force value. Between the first threshold force value and a second threshold force value, the biometric input device 606 may capture one or more fingerprint images. Above the second threshold force value, the device 600 may power off. It should be understood that a variety of actions may result from the application of varying amounts of force, and that the above illustrations are exemplary in nature.

The device 600 also includes processing circuitry 640. The processing circuitry 640 is operatively connected to components of the device 600, such as a biometric input device 606. The processing circuitry 640 is configured to detect the features of a fingerprint, such as valleys and ridges, and resolve biometric data, such as a fingerprint image, based on signals received from the biometric input device 606.

The processing circuitry 640 may also be configured to receive force input from the force sensor 628. In some embodiments, the processing circuitry 640 may receive a binary force input, or actuation signal from the force sensor 628 and cause further actions, such as the capture of fingerprint images by the biometric input device 606, based on the received force input. In other embodiments, the processing circuitry 640 may determine a non-binary amount of force based on signals received from the force sensor 628. In accordance with the embodiments described herein, the processing circuitry 640 may be configured to operate using a dynamic or adjustable force threshold.

In addition, the processing circuitry 640 may be operatively connected to computer memory 642. The processing circuitry 640 may be operatively connected to the memory 642 component via an electronic bus or bridge. The processing circuitry 640 may include one or more computer processors or microcontrollers that are configured to perform operations in response to computer-readable instructions. The processing circuitry 640 may include a central processing unit (CPU) of the device 600. Additionally or alternatively, the processing circuitry 640 may include other processors within the device 600 including application specific integrated chips (ASIC) and other microcontroller devices. The processing circuitry 640 may be configured to perform functionality described in the examples above.

The memory 642 may include a variety of types of non-transitory computer-readable storage media, including, for example, read access memory (RAM), read-only memory (ROM), erasable programmable memory (e.g., EPROM and EEPROM), or flash memory. The memory 642 is configured to store computer-readable instructions, sensor values, and other persistent software elements.

In this example, the processing circuitry 640 is operable to read computer-readable instructions stored on the memory 642. The computer-readable instructions may adapt the processing circuitry 640 to perform the operations or functions described above with respect to FIGS. 1-5. The computer-readable instructions may be provided as a computer-program product, software application, or the like.

The device 600 may also include a battery 652 that is configured to provide electrical power to the components of the device 600. The battery 652 may include one or more power storage cells that are linked together to provide an internal supply of electrical power. The battery 652 may be operatively coupled to power management circuitry that is configured to provide appropriate voltage and power levels for individual components or groups of components within the device 600. The battery 652, via power management circuitry, may be configured to receive power from an external source, such as an alternating current power outlet. The battery 652 may store received power so that the device 600 may operate without connection to an external power source for an extended period of time, which may range from several hours to several days.

In some embodiments, the device 600 also includes a display 604 that renders visual information generated by the processing circuitry 640. The display 604 may include a liquid-crystal display, light-emitting diode, organic light emitting diode display, organic electroluminescent display, electrophoretic ink display, or the like. If the display 604 is a liquid-crystal display or an electrophoretic ink display, the display may also include a backlight component that can be controlled to provide variable levels of display brightness. If the display 604 is an organic light-emitting diode or organic electroluminescent type display, the brightness of the display 604 may be controlled by modifying the electrical signals that are provided to display elements. The display bay be affixed to and/or positioned at least partially within the housing.

In some embodiments, the device 600 includes one or more input devices 654. The input device 654 is a device that is configured to receive user input. The input device 654 may include, for example, a push button, a touch-activated button, or the like. In some embodiments, the input devices 654 may provide a dedicated or primary function, including, for example, a power button, volume buttons, home buttons, scroll wheels, and camera buttons. Generally, a biometric input device and a force sensor may also be classified as input components. However, for purposes of this illustrative example, the biometric input device 606 and force sensor 628 are depicted as distinct components within the device 600.

The device 600 may also include a haptic actuator 656. The haptic actuator 656 may be implemented as described above, and may be a ceramic piezoelectric transducer. The haptic actuator 656 may be controlled by the processing circuitry 640, and may be configured to provide haptic feedback to a user interacting with the device 600.

The device 600 may also include a communication port 646 that is configured to transmit and/or receive signals or electrical communication from an external or separate device. The communication port 646 may be configured to couple to an external device via a cable, adaptor, or other type of electrical connector. In some embodiments, the communication port 646 may be used to couple the device 600 to a host computer.

The device 600 may also include a signal generator 650. The signal generator 650 may be operatively connected to the biometric input device 606 and/or the haptic actuator 656. The signal generator 650 may transmit electrical signals to the haptic actuator 656 and/or the biometric input device 606. The signal generator 650 is also operatively connected to the processing circuitry 640. The processing circuitry 640 is configured to control the generation of the electrical signals for the haptic actuator 656 and the biometric input device 606. In some embodiments, distinct signal generators 650 may be connected to the biometric input device 606 and the haptic actuator 656.

The memory 642 can store electronic data that can be used by the signal generator 650. For example, the memory 642 can store electrical data or content, such as timing signals, algorithms, and one or more different electrical signal characteristics that the signal generator 650 can use to produce one or more electrical signals. The electrical signal characteristics include, but are not limited to, an amplitude, a phase, a frequency, and/or a timing of an electrical signal. The processing circuitry 640 can cause the one or more electrical signal characteristics to be transmitted to the signal generator 650. In response to the receipt of the electrical signal characteristic(s), the signal generator 650 can produce an electrical signal that corresponds to the received electrical signal characteristic(s).

The foregoing description, for purposes of explanation, used specific nomenclature to provide a thorough understanding of the described embodiments. However, it will be apparent to one skilled in the art that the specific details are not required in order to practice the described embodiments. As one example, although a fingerprint sensor is discussed at length herein, a vein or capillary sensor, skin pattern sensor, or other biometric sensor capable of distinguishing a person's identity may be used instead. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, which benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

What is claimed is:

1. An electronic device, comprising:
a housing comprising a conductive material and defining a first opening and a second opening;
a display positioned at least partially within the first opening of the housing;
a cover positioned over the display and defining a front surface of the electronic device; and
a biometric input device positioned at least partially within the second opening and comprising:
 a sensor cover formed from a sapphire material and defining an input surface having a length that exceeds a width and configured to move within the second opening;
 a conductive frame surrounding the sensor cover and configured to move with the sensor cover; and
 a biometric sensor positioned below the sensor cover and configured to obtain fingerprint information in response to a touch input applied to the sensor cover; and
an isolation member that electrically isolates the conductive frame from the housing.

2. The electronic device of claim 1, wherein:
the biometric sensor comprises an array of capacitive electrodes configured to obtain the fingerprint information;
the fingerprint information includes information regarding a set of ridges and information regarding a set of valleys of a fingerprint; and
the electronic device is configured to create a fingerprint image based, at least in part, on the set of ridges and the set of valleys.

3. The electronic device of claim 2, wherein:
the electronic device further comprises a force sensor positioned below the biometric sensor and configured to detect an amount of force associated with the touch input; and
the biometric sensor is configured to obtain the fingerprint image in response to the amount of force satisfying a force threshold.

4. The electronic device of claim 1, wherein the sensor cover is configured to move from an undepressed position to a depressed position in response to a press input and remain in the undepressed position in response to the press input.

5. The electronic device of claim 4, wherein the conductive frame is coupled to a biasing component configured to return the sensor cover and the conductive frame to an original position in response to removal of the press input.

6. The electronic device of claim 4, wherein the electronic device is configured to change a power state in response to the press input.

7. The electronic device of claim 1, wherein:
the sapphire material is at least partially transparent; and
the biometric input device further comprises a masking layer positioned between the sensor cover and the biometric sensor.

8. The electronic device of claim 1, wherein in an unpressed position, the sensor cover is raised with respect to an outer surface of the housing.

9. An electronic device comprising:
a metal housing defining an opening in a side of the electronic device;
a display positioned at least partially within the housing; and
a button positioned at least partially within the opening of the metal housing and comprising:
 a button cover defining an input surface, the button cover configured to move with respect to the housing in response to an input force applied to the input surface, the button cover having a length that exceeds a width;
 a conductive frame at least partially surrounding the button cover and electrically isolated from the metal housing;
 a capacitive sensor positioned below the button cover and configured to capture a fingerprint image; and
 an electronic switch positioned below the conductive frame and configured to output a signal in response to the input force.

10. The electronic device of claim 9, further comprising an isolation member, wherein the isolation member electrically isolates the conductive frame from the metal housing.

11. The electronic device of claim 9, wherein an outer surface of the button cover is raised with respect to an outer surface of the metal housing.

12. The electronic device of claim 11, wherein at least a portion of the conductive frame extends out of the metal housing.

13. The electronic device of claim 9, wherein:
the electronic switch comprises a force sensor configured to measure the input force applied to the button cover; and
in response to the measured input force satisfying a threshold, the capacitive sensor is configured to capture the fingerprint image.

14. The electronic device of claim 13, wherein the force sensor comprises a capacitive force sensor.

15. An electronic tablet comprising:
a display assembly defining a front surface of the electronic tablet;
a housing comprising metal material, at least partially containing the display assembly and defining a side surface of the electronic tablet and an opening in the side surface; and
a fingerprint sensor positioned at least partially within the opening and comprising:
 a sensor cover defining an input surface and having a length that exceeds a width, the sensor cover configured to move from an undepressed position to a depressed position;
 a conductive frame rigidly coupled to and at least partially surrounding the sensor cover and electrically isolated from the metal material of the housing; and
 a capacitive sensor positioned below the sensor cover and configured to capture a fingerprint image.

16. The electronic tablet of claim 15, further comprising a force sensor configured to measure an amount of force applied to the sensor cover.

17. The electronic tablet of claim 16, wherein in response to the amount of force being below a threshold:
the sensor cover is configured to remain in the undepressed position; and
the fingerprint sensor is configured to activate the capacitive sensor and capture the fingerprint image.

18. The electronic tablet of claim 16, wherein in response to the amount of force being above a threshold:
- the sensor cover is configured to move to the depressed position; and
- the fingerprint sensor is configured to cause a change in a power state of the electronic tablet.

19. The electronic tablet of claim 15, wherein in the undepressed position, the input surface is raised with respect to the side surface.

* * * * *